United States Patent
Vivanco et al.

(10) Patent No.: US 8,774,035 B1
(45) Date of Patent: Jul. 8, 2014

(54) MANAGING A NETWORK CONNECTION OF A WIRELESS DEVICE

(75) Inventors: Daniel Vivanco, Reston, VA (US); Aik Chindapol, Washington, DC (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 101 days.

(21) Appl. No.: 13/281,618

(22) Filed: Oct. 26, 2011

(51) Int. Cl.
*H04L 12/58* (2006.01)
*H04W 36/26* (2009.01)

(52) U.S. Cl.
CPC .................................... *H04W 36/26* (2013.01)
USPC .......................................................... 370/252

(58) Field of Classification Search
CPC .................................................... H04W 36/24
USPC ............... 370/252, 331, 235; 455/432.1, 411, 455/452.1
See application file for complete search history.

(56) References Cited

U.S. PATENT DOCUMENTS

| | | | |
|---|---|---|---|
| 7,310,511 B2 | 12/2007 | Barnea et al. | |
| 7,844,728 B2 | 11/2010 | Anderson et al. | |
| 2005/0003824 A1* | 1/2005 | Siris | 455/452.1 |
| 2009/0225723 A1 | 9/2009 | Tenneti et al. | |
| 2009/0264121 A1 | 10/2009 | Chakri et al. | |
| 2010/0014483 A1* | 1/2010 | Hancock et al. | 370/331 |
| 2010/0048205 A1* | 2/2010 | Guilford et al. | 455/432.1 |
| 2011/0007705 A1* | 1/2011 | Buddhikot et al. | 370/331 |
| 2012/0108206 A1* | 5/2012 | Haggerty | 455/411 |
| 2013/0250768 A1* | 9/2013 | Raleigh | 370/235 |

* cited by examiner

*Primary Examiner* — Dang Ton
*Assistant Examiner* — Lionel Preval

(57) ABSTRACT

Application requirements of an application running on a wireless device are received. The wireless device is handed off from a first network to a second network when a first handoff criteria is met based on the application requirements, first network conditions, and second network conditions. A second network usage of the application is limited based on the application requirements and the second network conditions, and first network conditions are monitored while the application is running on the wireless device in communication with the second network. The wireless device is handed off from the second network to the first network when a second handoff criteria is met based on the application requirements, the first network conditions and the second network conditions.

20 Claims, 5 Drawing Sheets

MANAGING A NETWORK CONNECTION OF A WIRELESS DEVICE

TECHNICAL BACKGROUND

Multi-frequency communication networks are capable of providing access to a communication network, such as the Internet, through more than one frequency band. Each wireless band may have different characteristics, including differences in coverage and differences in available and total channel capacity and spectrum. Different transmissions schema can be used, such as time-division or frequency-division multiplexing.

Frequency bands may be controlled by more than one network operator, which can permit wireless devices to access the controlled network under a subscription agreement. The network to which a wireless device is subscribed is sometimes called a home network. Wireless devices can also be permitted to access networks other than the network to which they are subscribed, sometimes referred to as foreign networks. However, roaming fees can be charged to the subscriber according to the access to the foreign network. Roaming fees can be calculated in a number of ways, for example, based on a number of bytes of data consumed on the foreign network. A subscriber is typically charged roaming fees on top of a subscription charge for access to the home network. It is therefore in the interest of the operator of the home network to avoid and/or reduce, to the extent possible, having their subscribers roam to foreign networks while delivering quality user experience.

Overview

In an embodiment, application requirements of an application running on a wireless device are received. The wireless device is handed off from a first network to a second network when a first handoff criteria is met based on the application requirements, first network conditions, and second network conditions. A second network usage of the application is limited based on the application requirements and the second network conditions, and first network conditions are monitored while the application is running on the wireless device in communication with the second network. The wireless device is handed off from the second network to the first network when a second handoff criteria is met based on the application requirements, the first network conditions and the second network conditions.

DETAILED DESCRIPTION

In an embodiment, a wireless device running an application is in communication with a first network, and application requirements of the application are determined. The wireless device is handed off from the first network to the second network when a first handoff criteria is met based on the application requirements, first network conditions, and second network conditions. Usage of the second network by the application is limited based on the application requirements and the second network conditions, and while the application is running the first network conditions are monitored. When a second handoff criteria is met based on the application requirements, the first network conditions and the second network conditions, the wireless device is handed off from the second network to the first network.

Figure 1A:
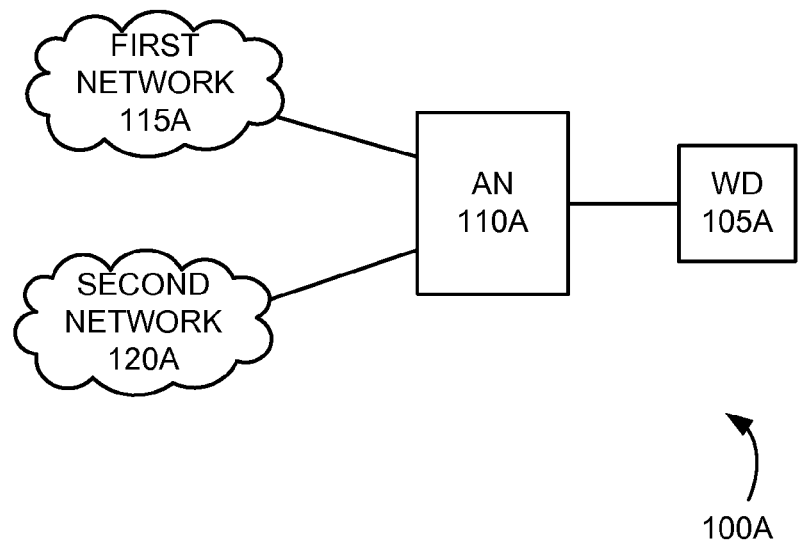
FIGS. 1A and 1B illustrate exemplary wireless communication systems.

FIG. 1A illustrates an exemplary wireless communication system 100A comprising a wireless device 105A, an access node 110A, a first communication network 115A and a second communication network 120A. Other network elements may be present in the communication system 100A to facilitate wireless communication but are omitted for clarity, such as additional base stations, base station controllers, gateways, mobile switching centers, dispatch application processors, and location registers such as a home location register or visitor location register. Other network elements may also be present to facilitate communication between the access node 110A, the first network 115A and the second network 120A which are omitted for clarity, including additional processing nodes, routers, gateways, and physical and/or wireless data links for carrying data among the various network elements.

Examples of a wireless device 105A include a cell phone, a smart phone, a computing platform such as a laptop, palmtop, or tablet, a personal digital assistant, an internet access device, or other device capable of wireless communication, including combinations thereof. The wireless device 105A can execute applications (not illustrated) which send and/or receive data via the first and/or second communication networks 115A and 120A. An application running on the wireless device can have an application requirement, such as a minimum data rate or data requirement, which must be met in order to maintain a threshold level of application performance.

First and second communication networks 115A and 120A are networks or internetworks and are in communication with the access node 110A. Access node 110A communicates with the wireless device 105A, and can be, for example, a plurality of base transceiver stations or eNodeB devices, each typically associated with one of the first and second communication networks 115A and 120A. The first network 115A can be a home network of the wireless device, and the second network 120A can be a foreign network in which the wireless device 105A is not registered, but with which the wireless device 105A may nonetheless communicate in order to send and receive data. In each of the first and second networks 115A and 120A, the wireless device 105A can be provided with different access to data, different services, and different data rates. In addition, there may be different fees assessed to a subscriber account of the wireless device 105A according to whether it is in communication with the first network 115A or the second network 120A. For example, for the wireless device 105A, access to the second network 120A (as a foreign network) can be more expensive than access to the first network 115A (as a home network). Access fees can be determined any number of ways, for example, according to the amount of data sent or received, or according to a data rate, or according to an amount of time that the wireless device is in communication with a network, or some combination thereof. Other fee structures for access to the first and second networks 115A and 120A are also possible.

The wireless devices 105A, the access node 110A, the first communication network 115A and the second communication network 120A each communicate over wired or wireless communication links or combinations thereof. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Wireless Fidelity (WiFi), Worldwide Interoperability for Microwave Access (WiMAX), or Long Term Evolution (LTE), or combinations thereof. Other wireless protocols can also be used.

Wireless device 105A can access both the first network 115A and the second network 120A. For example, the wireless device 105A can be in a location from which it can access either network. The network access can be facilitated by access node 110A. Typically, the wireless device 105A initiates communication with the first network 115A, its home network, and accesses communication and data services through the first network 115A. Wireless device 105A can run an application which sends and/or receives data through the first network 115A. If network resources of the first network 115A are insufficient to meet the requirements of the application running on the wireless device 105A, the wireless device 105A is permitted to access the second network 120A when sufficient resources are present in the second network 120A to satisfy the requirements of the application of the wireless device 105A. Thus, while the application is running on the wireless device 105A, the wireless device can be handed off (also referred to as handed over) to the second network 120A when a first handoff criteria is met based on application requirements of the application running on the wireless device 105A, first network conditions, and second network conditions. Network conditions can include, for example, the availability of carrier bands in a network, radio frequency (RF) environment conditions, available modulation and coding schemes, and backhaul and/or network congestion. Network conditions can also include a usage fee for accessing a network. Hand off of the wireless device 105A to the second network 120A can be initiated by the first network 115A through the access node 110A. However, in the case where the wireless device 105A is a subscriber of the first network 115A, additional usage fees may apply, such as roaming charges, to the access of the second network 120A by the wireless device 105A.

Based on the application requirements and second network conditions, the usage of the second network by the application running on the wireless device 105A is limited. For example, an amount of data which the application sends to or receives from the second network, or a data rate to and from the second network, or an amount of time which the wireless device communicates with the second network, can be limited, in order to provide the wireless device with sufficient data to meet the application requirements, while limiting communication activity with the second network 120A which will increase usage fees to the wireless device 105A. In an embodiment, data can be buffered at the access node 110A to reduce the data sent to the wireless device 105A per unit time, but data can be sufficiently provided to the wireless device 105A to satisfy application requirements of the application.

While the wireless device 105A is running the application and is in communication with the second network 120A, conditions in the first network 115A are monitored. When a second handoff criteria is met based on the application requirements, the first network conditions and the second network conditions, the wireless device 105A is handed off to the first network 115A while the application is running on the wireless device 105A. In operation, before handing off the wireless device from the second network to the first network, RF resources are reserved in the first network 115A to assure promptly delivery of buffered packets.

Figure 1B:
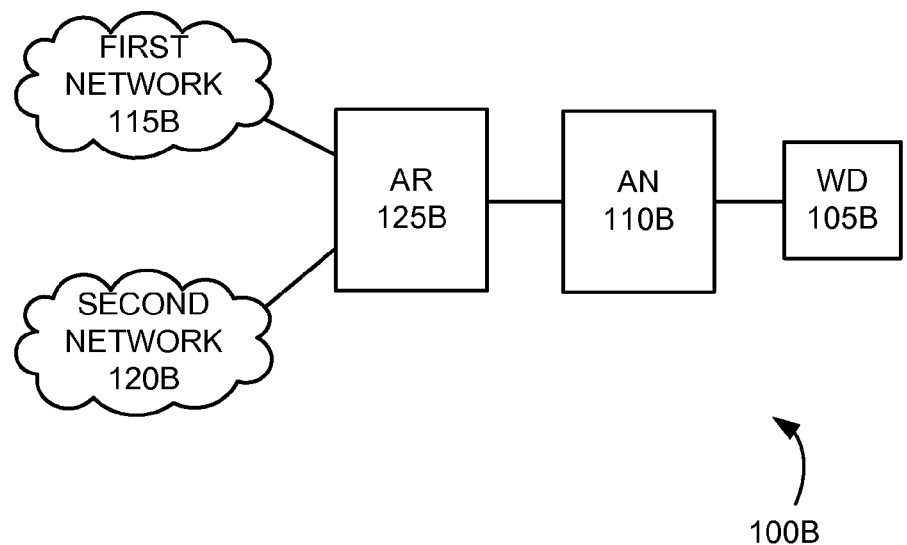

FIG. 1B illustrates an exemplary wireless communication system 100B comprising wireless device 105B, access node 110B, aggregation router 125B, first communication network 115B and second communication network 120B. The wireless device 105B, the access node 110B, the first communication 115B and the second communication network 120B are analogous to similar network elements described above with respect to FIG. 1A. The aggregation router 125B is in communication with the access node 110B, the first communication network 115B and the second communication network 120B over wired and/or wireless communication links analogous to those described above. The aggregation router 125B can function to limit the amount of data which the application sends to or receives from the second network, or a data rate to and from the second network, or an amount of time which the wireless device communicates with the second network 120B. The aggregation router can also function to shape traffic on the communication link between the access node 110B and the wireless device 105B. While the aggregation router is illustrated as an independent network element in FIG. 1B, this is not a limitation, and the functions of the aggregation router can be included in another network element, such as a gateway, or in an access node such as access node 110B or 110A. In an embodiment, data can be buffered at the aggregation router 125B to reduce the data sent to and from the wireless device 105B per unit time, but data can be sufficiently provided to the wireless device 105B to satisfy application requirements of the application.

Figure 2:
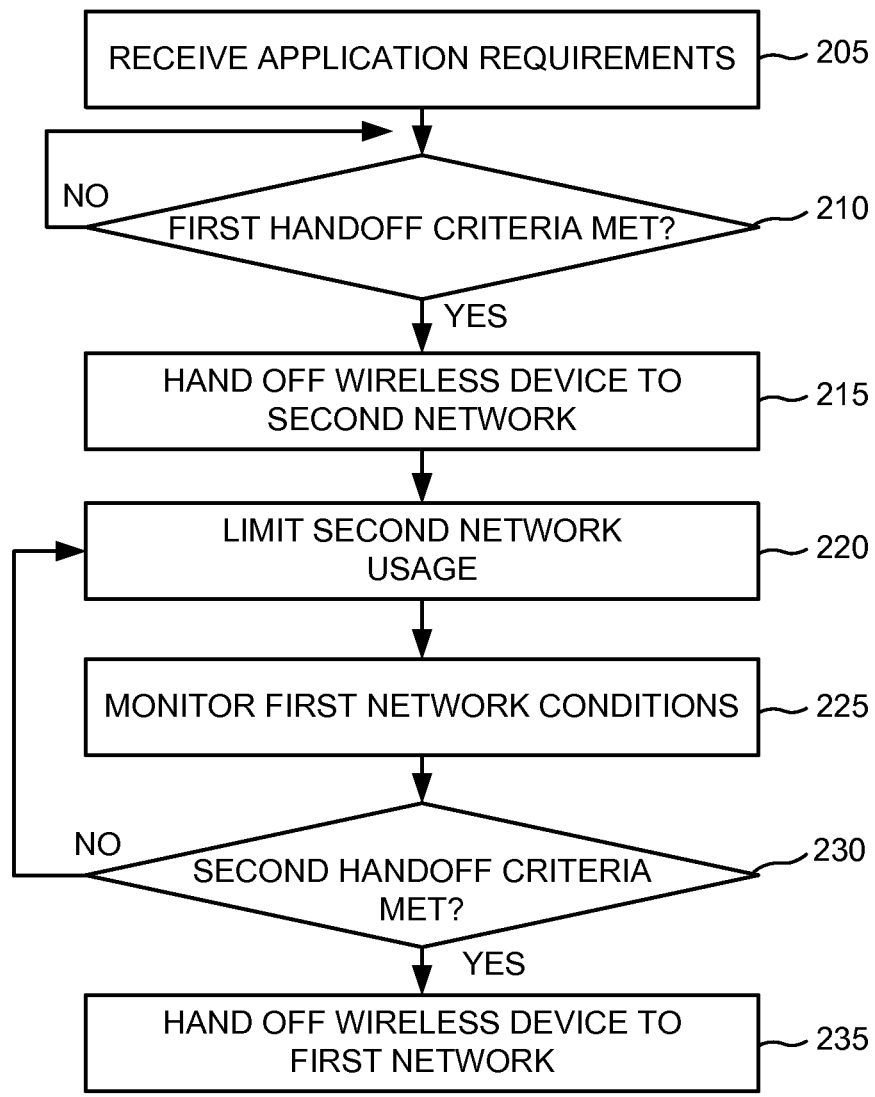
FIG. 2 illustrates an exemplary method of managing a network connection of a wireless device with a first network and a second network.

FIG. 2 illustrates an exemplary method of managing a network connection of a wireless device with a first network and a second network. In operation 205, application requirements of an application running on the wireless device, such as wireless device 105A or 105B, are received from the wireless device at a network element while the wireless device is in communication with the first network. The network element can be, for example, an aggregation router, or it can be an access node, or it can be another network element of the first network. When a first handoff criteria is met (operation 210-YES), the wireless device is handed off to a second network (operation 215). The handoff criteria can be based on the application requirements, first network conditions, and second network conditions. Network conditions can be based on, for example, available network carriers, network RF conditions, available modulation and coding schemes, congestion in the network, including backhaul congestion, and network usage fees.

In operation 220, based on the application requirements and second network conditions, the usage of the second network by the application running on the wireless device 105A is limited. For example, an amount of data which the application sends to or receives from the second network, or a data rate to and from the second network, or an amount of time which the wireless device communicates with the second network, can be limited, in order to provide the wireless device with sufficient data to meet the application requirements, while limiting communication activity with the second network 120A which will increase usage fees to the wireless device 105A. In an embodiment, data can be buffered at the access node 110A or the aggregation router 125B to reduce the data sent to the wireless device 105A, but data can be sufficiently provided to the wireless device 105A to satisfy application requirements of the application.

While the wireless device is in communication with the second network, network conditions in the first network are monitored (operation 225). When a second handoff criteria is met based on the application requirements (operation 230-YES), the first network conditions and the second network conditions, the wireless device is handed off to the first network (operation 235). Typically, the second handoff criteria is determined in order to reduce the usage fees incurred by the wireless device in the second network.

Figure 3:
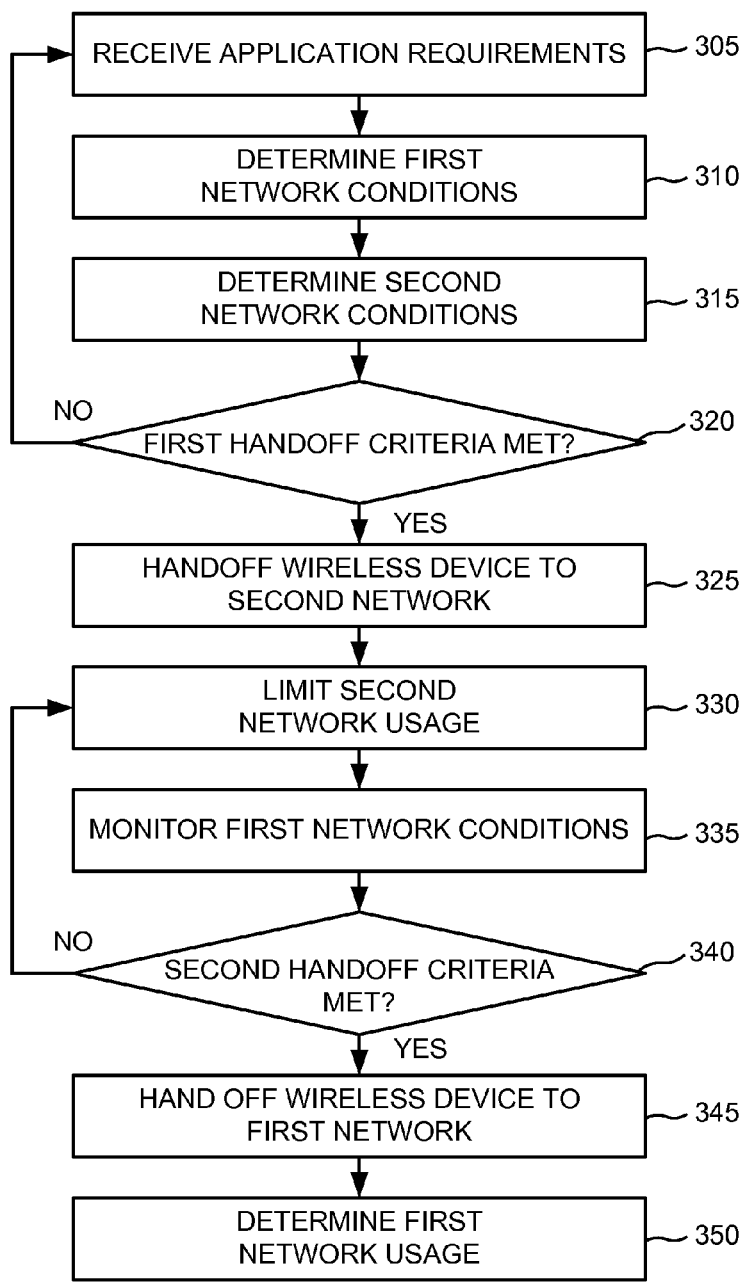
FIG. 3 illustrates another exemplary method of managing a network connection of a wireless device with a first network and a second network.

FIG. 3 illustrates another exemplary method of managing a network connection of a wireless device with a first network and a second network. In operation 305, application requirements are received from a wireless device (such as wireless devices 105A or 105B) at a network element while the wireless device is in communication with a first network. The network element can be, for example, an aggregation router, or it can be an access node, or it can be another network element of the first network. In operations 310 and 315, conditions in a first network (such as first networks 115A or 115B) and in a second network (such as second networks 120A or 120B) are determined. Network conditions can include, for example, the availability of carrier bands in a network, radio frequency (RF) environment conditions, available modulation and coding schemes, and backhaul and/or network congestion. Network conditions can also include a usage fee for accessing a network.

When a first handoff criteria is met (operation 320-YES), the wireless device is handed off to a second network (operation 325). The handoff criteria can be based on the application requirements, first network conditions, and second network conditions. In operation 330, based on the application requirements and second network conditions, the usage of the second network by the application running on the wireless device is limited. For example, an amount of data which the application sends to or receives from the second network, or a data rate to and from the second network, or an amount of time which the wireless device communicates with the second network, can be limited, in order to provide the wireless device with sufficient data to meet the application requirements, while limiting communication activity with the second network which will increase usage fees to the wireless device. If the second network conditions change, the second network usage can be adjusted dynamically according to the changed second network conditions and the application requirements. In an embodiment, data can be buffered at the access node or the aggregation router to reduce the data sent to the wireless device, but data can be sufficiently provided to the wireless device to satisfy application requirements of the application.

One example of a mechanism to limit communication activity with the second network is a so-called "leaky bucket" mechanism to reduce a bit rate of data transmitted to and from the second communication network. Through the use of a leaky bucket algorithm, a packet data rate can be adjusted to a relatively constant data rate. The amount of data buffered and an outgoing bit rate can be determined, and can also be dynamically adjusted, based on, among other things, the application requirements and second network conditions. Data traffic can thus be shaped to a relatively constant, predictable data rate, which meets the application requirements.

While the wireless device is in communication with the second network, network conditions in the first network are monitored (operation 335). When a second handoff criteria is met based on the application requirements (operation 340), the first network conditions and the second network conditions, the wireless device is handed off to the first network (operation 345). In operation, the second handoff criteria is determined in order to reduce the usage fees incurred by the wireless device in the second network.

In operation 350, a usage of the first network by the wireless device is determined. If, for example, data has been buffered at the access node or the aggregation router, a data rate or access time can be determined to provide the buffered data to the wireless device rapidly. The provided data can be used by the application running on the wireless device, and if the data is not immediately needed by the application, the data can be buffered on the wireless device for use by the application. The usage of the first network can be, for example a data rate, which can be based on the application requirements, the availability of carrier bands in a network, radio frequency (RF) environment conditions, available modulation and coding schemes, backhaul and/or network congestion, and an amount of data buffered in the access node and/or the aggregation router.

One example of a mechanism to determine a usage of the first network by the wireless device is a so-called "token bucket" mechanism, which, among other things, can allow prompt delivery of buffered packets to the wireless device. By use of a token bucket algorithm, data traffic can be shaped dynamically so that a burst of data, such as buffered data, can be transmitted up to a determined burst rate. By analogy, a token bucket contains tokens, each of which can represent a unit of bytes or a single packet of predetermined size. The number of tokens determine the ability to send a packet, according to a predetermined token threshold, and the more tokens are in the bucket, the greater the permitted data burst, up to a peak data rate. The token bucket can be adjusted dynamically according to, among other things, the application requirements, the availability of carrier bands in a network, radio frequency (RF) environment conditions, available modulation and coding schemes, backhaul and/or network congestion, and an amount of data buffered in the access node and/or the aggregation router.

Figure 4:
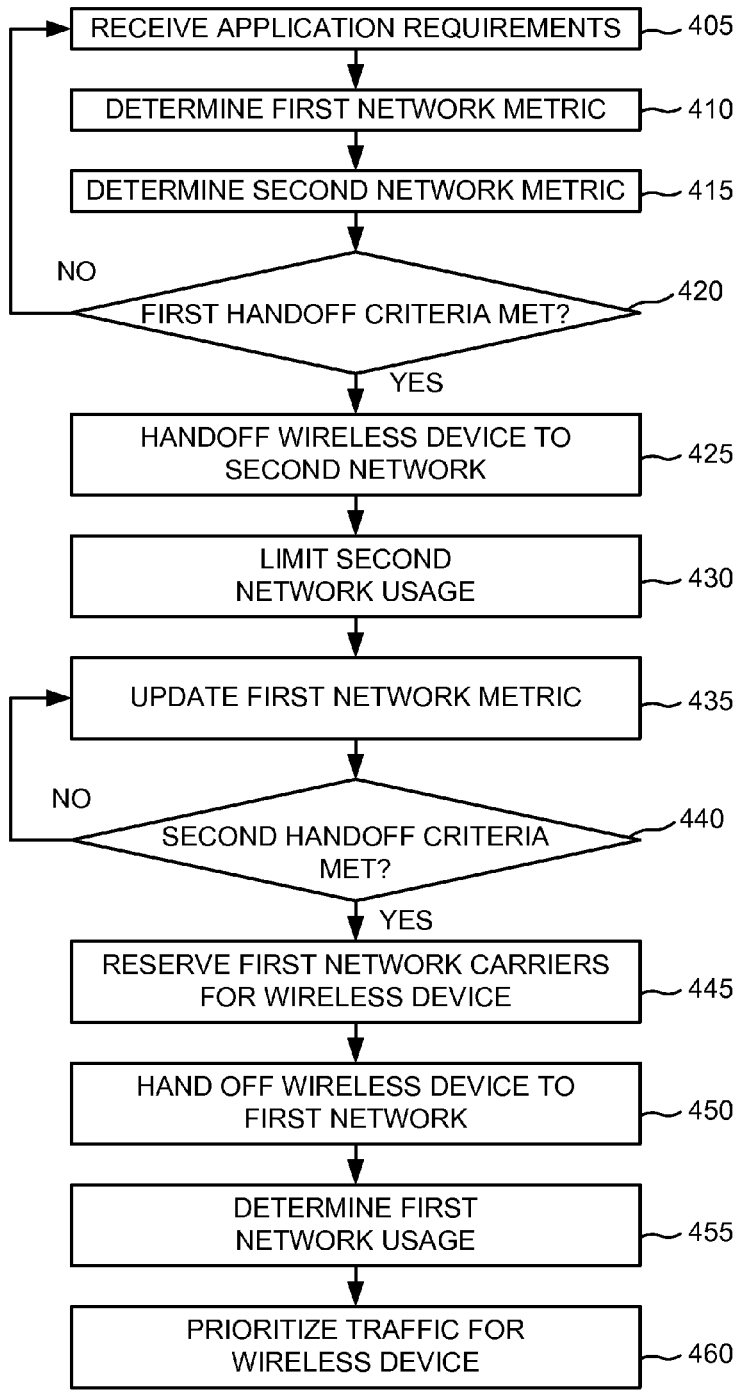
FIG. 4 illustrates another exemplary method of managing a network connection of a wireless device with a first network and a second network.

FIG. 4 illustrates another exemplary method of managing a network connection of a wireless device with a first network and a second network. In operation 405, application requirements are received from a wireless device (such as wireless devices 105A or 105B) at a network element while the wireless device is in communication with a first network. The network element can be, for example, an aggregation router, or it can be an access node, or it can be another network element of the first network. In operations 410 and 415, a first network metric (for example, in first networks 115A or 115B) and a second network metric (for example, in second networks 120A or 120B) are determined. Network metrics can be based on, for example, the availability of carrier bands in a network, radio frequency (RF) environment conditions, available modulation and coding schemes, and backhaul and/or network congestion. Network conditions can also include a usage fee for accessing a network.

When a first handoff criteria is met (operation 420-YES), the wireless device is handed off to a second network (operation 425). The handoff criteria can be based on the application requirements, first network conditions, and second network conditions. In operation 430, based on the application requirements and second network conditions, the usage of the second network by the application running on the wireless device is limited. For example, an amount of data which the application sends to or receives from the second network, or a data rate to and from the second network, can be limited. In addition, an amount of time which the wireless device communicates with the second network, or a number of duty cycles in which the wireless device communicates with the second network, can be limited. Such limits can be imposed on the usage of the second network by the application running on the wireless device such that the wireless device is provided with sufficient data to meet the application requirements while limiting communication activity with the second network which will increase usage fees to the wireless device. If the second network conditions change, the second network usage can be adjusted dynamically according to the changed second network conditions and the application requirements. In an embodiment, data can be buffered at the access node or the aggregation router to reduce the data sent to the wireless device, but data can be sufficiently provided to the wireless device to satisfy application requirements of the application. A buffer metric can be determined to monitor whether the buffer metric is approaching a buffer threshold. The buffer metric can be determined based on the application requirements and the second network usage. The buffer metric can also be based on the amount of data buffered.

While the wireless device is in communication with the second network, the first network metric is updated based on information received from the first network (operation 435). When a second handoff criteria is met based on the application requirements (operation 440), the first network metric and the second network metric, carrier bands and/or bandwidth is reserved in the first communication network (operation 445) and the wireless device is handed off to the first network (operation 445). The carrier bands and/or bandwidth are reserved in the first network to provide sufficient bandwidth for a high rate of data transfer to the wireless device, according to, among other things, an amount of data buffered for the wireless device, the application requirements, RF conditions, and available modulation and coding schemes.

The second handoff criteria is determined in order to reduce the usage fees incurred by the wireless device in the second network. The second handoff criteria can also be based at least in part on the buffer metric. For example, if the buffer metric meets a buffer threshold, the second handoff criteria can be adjusted to increase the likelihood of handing off the wireless device from the second network to the first network, in order to, for example, avoid dropping data packets from the buffer.

In operation 450, a usage of the first network by the wireless device is determined. If, for example, data has been buffered at the access node or the aggregation router, a data rate or access time can be determined to provide the buffered data to the wireless device rapidly. The provided data can be used by the application running on the wireless device, and if the data is not immediately needed by the application the data can be buffered on the wireless device for use by the application. The usage of the first network can be, for example a data rate, which can be based on the application requirements, the availability of carrier bands in a network, radio frequency (RF) environment conditions, available modulation and coding schemes, backhaul and/or network congestion, and an amount of data buffered in the access node and/or the aggregation router. In addition, in order to provide for rapid transfer of data to the wireless device, in operation 460, traffic destined for the wireless device can be given a higher priority in the network to preferentially route and deliver the buffered data to the wireless device.

Figure 5:
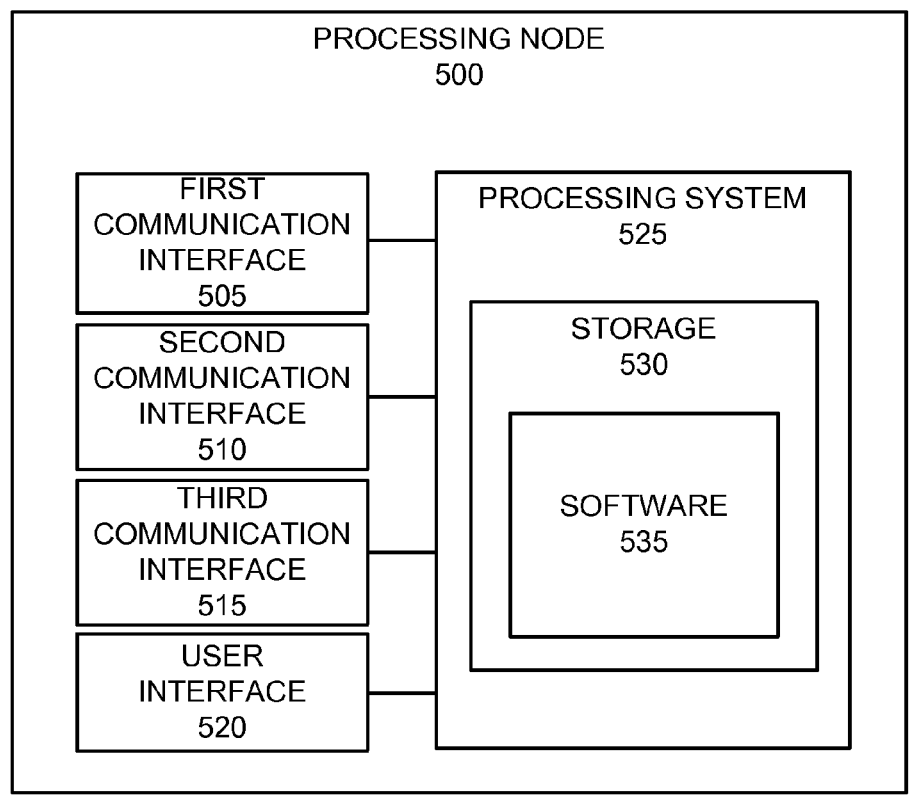
FIG. 5 illustrates an exemplary processing node.

FIG. 5 illustrates an exemplary processing node. Processing node 500 comprises a first communication interface 505, a second communication interface 510, a third communication interface 515, and a user interface 520, each in communication with a processing system 525. Processing node 500 can communicate with a wireless device through the first communication interface 505, a first network through the second communication interface 510, and a second network through the third communication interface 515. The processing system 525 can determine network usage of the first and second networks by the wireless device. Processing system 525 can include storage 530. Storage 530 comprises a disk drive, flash drive, memory circuitry, or other memory device. Storage 530 can store software 535 which is used in the operation of the processing node 500. Software 535 may include an operating system, utilities, drivers, network interfaces, applications, or some other type of software. User interface 520 permits a user to configure and control the operation of the processing node 500.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing a network connection of a wireless device with a first network and a second network, comprising:
  receiving at a first network element application requirements of an application running on the wireless device;
  handing off the wireless device from the first network to the second network when a first handoff criteria is met based on the application requirements, first network conditions, and second network conditions, wherein the first network does not meet the application requirements;
  limiting a second network usage of the application based on the application requirements and the second network conditions while providing the wireless device with sufficient data to meet the application requirements by at least one of limiting an amount of data which the application sends to or receives from the second network, limiting a data rate to or from the second network, limiting an amount of time which the wireless communication device communicates with the second network, limiting a number of duty cycles in which the wireless device communicates with the second network, and buffering data at a network element;
  monitoring the first network conditions while the application is running on the wireless device in communication with the second network;
  buffering data to be sent to the wireless device to reduce an amount of data sent to the wireless device, and determining a buffer metric based on an amount of the data buffered and the application requirements;
  adjusting a second handoff criteria based on the determined buffer metric; and
  handing off the wireless device from the second network to the first network when the adjusted second handoff criteria is met based on the application requirements, the first network conditions and the second network conditions, wherein the second handoff criteria is met when the first network meets the application requirements.

2. The method of claim 1, wherein after handing off the wireless device from the second network to the first network, the method further comprises:
  determining a first network usage based on the application requirements, the first network conditions, and an amount of data buffered at the network element.

3. The method of claim 2, further comprising:
  determining a first network usage based on the application requirements, the first network conditions, and the second network usage.

4. The method of claim 1, wherein the first network conditions are based on available first network carriers, first network RF conditions, and available modulation and coding schemes in the first network.

5. The method of claim 1, where in the second network conditions are based on available second network carriers, second network RF conditions, available modulation and coding schemes in the second network, and second network usage fees.

6. The method of claim 1, further comprising:
reserving first network carriers for the wireless device based on the application requirements and the first network metric; and
prioritizing traffic in the first network for the wireless device based on the application requirements and the first network metric.

7. The method of claim 1, wherein after limiting a second network usage, the method further comprises:
adjusting the second network usage based on changes in the second network conditions.

8. The method of claim 1, wherein after limiting a second network usage, the method further comprises:
determining a buffer metric based on the second network usage, the amount of the data buffered and the application requirements.

9. The method of claim 8, wherein handing off the wireless device from the second network to the first network further comprises:
handing off the wireless device from the second network to the first network when a second handoff criteria is met based on the application requirements, the first network conditions, the second network conditions, and the buffer metric.

10. The method of claim 8, wherein after handing off the wireless device from the second network to the first network, the method further comprises:
determining a first network usage based on the application requirements, the first network conditions, the second network conditions, and the buffer metric.

11. A processing node of a wireless communication network, comprising:
a first interface to communicate with a wireless device;
a second interface to communicate with a first network;
a third interface to communicate with a second network; and
a processor configured to
receive application requirements of an application of the wireless device,
hand off the wireless device from the first network to the second network when a first handoff criteria is met based on the application requirements, first network conditions, and second network conditions, wherein the first network does not meet the application requirements,
limit a second network usage for the wireless device based on the application requirements and the second network conditions while providing the wireless device with sufficient data to meet the application requirements by at least one of limiting an amount of data which the application sends to or receives from the second network, limiting a data rate to or from the second network, limiting an amount of time which the wireless communication device communicates with the second network, limiting a number of duty cycles in which the wireless device communicates with the second network, and buffering data at a network element,
monitor the first network conditions while the application is running on the wireless device in communication with the second network,
buffer data to be sent to the wireless device to reduce an amount of data sent to the wireless device, and determining a buffer metric based on an amount of the data buffered and the application requirements;
adjust a second handoff criteria based on the determined buffer metric; and
hand off the wireless device from the second network to the first network when the adjusted second handoff criteria is met based on the application requirements, the first network conditions and the second network conditions, wherein the second handoff criteria is met when the first network meets the application requirements.

12. The processing node of claim 11, wherein the processor is further configured to:
determine a first network usage based on the application requirements, the first network conditions, and an amount of data buffered at the network element after the wireless device is handed off from the second network to the first network.

13. The processing node of claim 12, wherein the processor is further configured to:
determine a first network usage based on the application requirements, the first network conditions, and the second network conditions.

14. The processing node of claim 11, wherein the first network conditions are based on available first network carriers, first network RF conditions, and available modulation and coding schemes in the first network.

15. The processing node of claim 11, wherein the second network conditions are based on available second network carriers, second network RF conditions, available modulation and coding schemes in the second network, and second network usage fees.

16. The processing node of claim 11, wherein the processor is further configured to:
reserve first network carriers for the wireless device based on the application requirements and the first network metric, and
prioritize traffic for the wireless device based on the application requirements and the first network metric.

17. The processing node of claim 11, wherein the processor is further configured to:
update the second network usage for the wireless device based on changes in the second network conditions.

18. The processing node of claim 11, wherein the processor is further configured to:
determine a buffer metric based on the second network usage, the amount of the data buffered and the application requirements.

19. The processing node of claim 18, wherein the processor is further configured to:
hand off the wireless device from the second network to the first network when a second handoff criteria is met based on the application requirements, the first network conditions, the second network conditions, and the buffer metric.

20. The processing node of claim 17, wherein the processor is further configured to:
determine a first network usage based on the application requirements, the first network conditions, the second network usage, and the data buffer criteria.

* * * * *